(12) United States Patent
Atsumi

(10) Patent No.: US 8,622,464 B2
(45) Date of Patent: Jan. 7, 2014

(54) STEERING SUPPORT MEMBER STRUCTURE

(75) Inventor: Ryo Atsumi, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 30 days.

(21) Appl. No.: 13/216,395

(22) Filed: Aug. 24, 2011

(65) Prior Publication Data
US 2012/0049573 A1 Mar. 1, 2012

(30) Foreign Application Priority Data

Aug. 25, 2010 (JP) ................................. 2010-188255

(51) Int. Cl.
*B62D 25/14* (2006.01)
(52) U.S. Cl.
USPC ...................................... 296/193.02; 296/72
(58) Field of Classification Search
USPC ........ 296/30, 70, 72, 187.03, 187.05, 187.12, 296/193.01, 193.02; 180/90; 280/752
See application file for complete search history.

(56) References Cited

U.S. PATENT DOCUMENTS

| | | | |
|---|---|---|---|
| 5,868,426 A * | 2/1999 | Edwards et al. | 280/779 |
| 6,155,631 A * | 12/2000 | Yoshinaka et al. | 296/193.02 |
| 6,250,678 B1 * | 6/2001 | Yoshinaka et al. | 280/752 |
| 6,554,352 B2 * | 4/2003 | Nagy | 296/203.02 |
| 8,342,599 B2 | 1/2013 | Atsumi et al. | |
| 2008/0054682 A1 * | 3/2008 | Ellison et al. | 296/193.02 |
| 2009/0039668 A1 * | 2/2009 | Baudart | 296/72 |

FOREIGN PATENT DOCUMENTS

| | | |
|---|---|---|
| DE | 102011111643 A1 | 3/2012 |
| JP | 10-129501 A | 5/1998 |
| JP | 2006-327397 A | 12/2006 |

OTHER PUBLICATIONS

German Office Action for Application No. 10 2011 111 644.7 dated Nov. 28, 2012.

* cited by examiner

*Primary Examiner* — Glenn Dayoan
*Assistant Examiner* — Jason S Daniels
(74) *Attorney, Agent, or Firm* — Lerner, David, Littenberg, Krumholz & Mentlik, LLP

(57) ABSTRACT

A structure of a steering support member, which enables the reduction of vehicle interior noise and steering vibration by suppressing the fore-and-aft vibration of the steering support member by means of a C-shaped or U-shaped brace and by increasing the rigidity of the steering support member in the front of the driver seat side, and enables the setting of a vibration mode in accordance with vehicle types by fine adjusting the positions of the brace and a steering bracket and by selecting the rigidity of the brace.

6 Claims, 2 Drawing Sheets

STEERING SUPPORT MEMBER STRUCTURE

CROSS-REFERENCE TO RELATED APPLICATIONS

The present application claims the benefit of Japanese Patent Application No. 2010-188255, filed Aug. 25, 2010, the disclosure of which is hereby incorporated by reference herein.

FIELD OF THE INVENTION

The present invention relates to the structure of a steering support member which is constructed across the width of a vehicle body within an instrument panel of a motor vehicle to support the steering column, etc.

DESCRIPTION OF RELATED ART

Conventionally, inside an instrument panel of a motor vehicle, a steering support member, which is a rigid member for supporting the steering column etc., is constructed across the width of the vehicle body. The steering support member is attached at both ends in the vehicle-body width direction to left and right dash side panels (pillars), and supports the steering column via a steering bracket on the driver seat side, and an instrument panel is mounted thereon, with heavy components such as meters and audio equipment of the instrument panel being suspended therefrom.

If the peripheral portions of such a steering support member have low rigidity, there is a concern that vibrations from the body suspension, particularly vibrations from the engine during idling may be transferred to the steering, and such vibrations may give discomfort such as by propagating to the driver or causing vehicle interior noise, as well as that vibrations of equipment may cause squeaking. Moreover, when a load is applied from the front of vehicle body, the upper part of the dash panel and the cowl panel may deform, intruding into the vehicle interior, and thereby the steering support member may deform toward the rear of the vehicle body, resulting in a problem of the retreat of the steering wheel.

For this reason, the rigidity of the steering support member itself is required to be raised and the connecting strength with the vehicle body is required to be increased, thereby improving vibration characteristics and reducing the deformation due to the load from the front of the vehicle body. Particularly problematic are a fore-and-aft (from diagonally to the upper front to diagonally to the lower rear) vibration mode in which the antinode of vibration curve is located at the middle in vehicle-body width direction of the steering support member, and a fore-and-aft vibration mode in which the node of vibration curve is located at both ends and the middle of the steering support member.

Thus, as disclosed by JP 10-129501 A, there are some conventional motor vehicles in which the vibration and the deformation of a steering support member are reduced by combining the steering support member with a cowl panel or dash panel in the front of the vehicle body, or the steering support member with the lower part of the dash panel or a floor panel in the lower part of the vehicle body, and a brace having a U-shaped cross section is used to achieve high rigidity of the brace.

Moreover, as disclosed in JP 4485992 B, there is a case in which the steering support member is made up of two pipes with the diameter of the pipe on the vehicle-body front side being configured to be larger than the diameter of the pipe on the vehicle-body rear side, in order to increase the rigidity of the steering support member on the driver seat side.

Nevertheless, there is a strict demand for reduction of vehicle interior noise and steering vibration in recent years, and it is necessary to achieve the reduction effect not only in vibration of a single frequency but also in vibrations in a wide frequency range.

Here, the vibration modes of the steering support member of concern are as follows:

1) a vibration mode in which vibrations having an antinode at the middle (and nodes at both ends) and the same phase near the brace in the fore-and-aft motion of the entire steering support member are combined (mode 1); and 2) a vibration mode in which vibrations having nodes at both ends and the middle, and opposite phases near the brace in the fore-and-aft motion of the entire steering support member are combined (mode 2).

Since these vibration modes inevitably take place in a long rod-like member, it is difficult to reduce vibration. Moreover, although the vibration can be reduced by adding a large number of members, such a measure is not suitable because it will result in an increase in the number of parts and the cost, and there is a concern about the decline of fuel efficiency due to the increase of weight.

For this reason, there is a need for a steering support member and a structure surrounding the member, to which an effective vibration reduction method is applied, and which is less likely to have vibration peaks, and allows the adjustment of the vibration characteristics in accordance with the type of vehicle.

Nevertheless, in the structure of the conventional steering support member disclosed in JP 10-129501 A, since load transfer to the cowl panel, the dash panel, and the floor panel cannot be sufficiently achieved, it is not possible to cope with the above-described strict demands for the reduction of vehicle interior noise as well as steering vibration. Moreover, the structure of the conventional steering support member disclosed in JP 4485992 B has a problem in that since the diameter of the pipe of the vehicle-body rear side, which significantly contributes to the vibration performance of the steering, is small and besides, since the pipe of the vehicle-body rear side is constructed along the vehicle-body width direction, an excess increase of weight is caused and the performance of suppressing the vibration will decrease.

SUMMARY OF THE INVENTION

The present invention has been made in view of such circumstances, and has as an object to provide a structure of a steering support member, which enables the reduction of vehicle interior noise and steering vibration by suppressing the fore-and-aft vibration of the steering support member by means of a C-shaped or U-shaped brace and by increasing the rigidity of the steering support member in the front of the driver seat side, and enables the setting of a vibration mode in accordance with vehicle types by fine adjusting the positions of the brace and a steering bracket and by selecting the rigidity of the brace.

In order to solve the above-described problems, the present invention is a structure of a steering support member which is constructed across a width of a vehicle body and attached to left and right sides of the vehicle body at both ends in a vehicle-body width direction via an end-part-connection bracket, in which the steering support member is made up of two support members which are disposed side by side in parallel, a first support member being disposed across the entire width of the vehicle body and a second support member being disposed in a corresponding location on a driver seat side, wherein an end part on vehicle body side of the second support member is attached, along with the first support member, to the vehicle body via the end-part-connection bracket, and an end part opposite the vehicle body of the second support member is attached to the first support member via an intermediate-part-connection bracket, wherein a C-shaped or U-shaped brace which extends in a vehicle body front-rear direction and straddles the first and second support members in the vehicle body front-rear direction, and a steering bracket which is C-shaped or made up of two parallel members and which extends in the vehicle body front-rear direction, are disposed in the middle in the vehicle-body width direction of the second support member, in which one edge part of the brace which connects to either or both of the first and second support members, and one member of the steering bracket which connects to the first and second support members are disposed so as to be overlapped at the middle in the vehicle-body width direction of the second support member, and another edge part of the brace which connects to either or both of the first and second support members, and the other member of the steering bracket which connects to the first and second support members are disposed so as to be overlapped at a position at ¼ of the total length of the second support member from the middle in the vehicle-body width direction of the second support member towards the intermediate-part-connection bracket, and wherein a C-shaped or U-shaped base part of the brace is connected to an upper part of a cowl panel or dash panel in the front of the vehicle body.

Moreover, in the present invention, there is constructed between the opposing edge parts of the C-shaped or U-shaped brace, a pipe member which is disposed in parallel with the first support member, and connects to the opposing edge parts at an intermediate position in the front-rear direction between the first support member and the base part of the brace.

Furthermore, in the present invention, the pipe member is a sheet metal which is flat in the horizontal direction.

Furthermore, in the present invention, the pipe member is formed of a resin material.

As described above, the structure of the steering support member relating to the present invention is one which is constructed across a width of a vehicle body and attached to left and right sides of the vehicle body at both ends in a vehicle-body width direction via an end-part-connection bracket, in which the steering support member is made up of two support members which are disposed side by side in parallel, a first support member being disposed across the entire width of the vehicle body and a second support member being disposed in the region of a corresponding location on a driver seat side, in which an end part on vehicle body side of the second support member is attached, along with the first support member, to the vehicle body via the end-part-connection bracket, and the end part opposite the vehicle body of the second support member is attached to the first support member via an intermediate-part-connection bracket, in which a C-shaped or U-shaped brace which extends in the vehicle body front-rear direction and straddles the first and second support members in the vehicle body front-rear direction, and a steering bracket which is C-shaped or made up of two parallel members and which extends in the vehicle body front-rear direction, are disposed in the middle in the vehicle-body width direction of the second support member, wherein one edge part of the brace which connects to either or both of the first and second support members, and one member of the steering bracket which connects to the first and second support members are disposed so as to be overlapped at the middle in the vehicle-body width direction of the second support member, and another edge part of the brace which connects to either or both of the first and second support members, and the other member of the steering bracket which connects to the first and second support members are disposed so as to be overlapped at a position at ¼ of the total length of the second support member from the middle in the vehicle-body width direction of the second support member towards the intermediate-part-connection bracket, and wherein a C-shaped or U-shaped base part of the brace is connected to an upper part of a cowl panel or dash panel in the front of the vehicle body.

Thus, in the structure of the present invention, two edge parts of the brace and two members of the steering bracket are overlappingly assembled into a lattice form for two support members: the first and second support members, so that the opposing both edge parts of the C-shaped or U-Shaped brace serve to suppress the vibration against the fore-and-aft vibration of the steering support member in the above-described vibration mode 1, and particularly the edge part on the middle side of the brace is close to the antinode of vibration and therefore is effective in suppressing the motion. Moreover, in the structure of the present invention, the opposing both edge parts of the C-shaped or U-shape brace serve to suppress the vibration against the fore-and-aft vibration of the steering support member in the above-described vibration mode 2, as well as have a reduction effect on the rotational component in the horizontal surface around the middle node. The amplitude near the C-shaped or U-shaped brace is reduced in motion, since vibrations of the nodes at both ends and the middle have opposite phases for the fore-and-aft motion of the whole structure, and thus the two amplitudes are neutralized in the vicinity of the outer edge part. Furthermore, the structure of the present invention allows the rigidity of the entire steering support member to be increased by the brace and the steering bracket which are disposed so as to be partially overlapped. Moreover, when the vibration mode is different between the first and second support members, since it becomes possible to suppress the antinode of the vibration by fine adjusting the position of the brace and the steering bracket, or selecting the rigidity of the brace, it is possible to set an optimal vibration mode in accordance with vehicle types.

Moreover, in the structure of the present invention, since there is constructed between the opposing edge parts of the C-shaped or U-shaped brace, a pipe member which is disposed in parallel with the first support member, and connects with the opposing edge parts at an intermediate position in the front-rear direction between the first support member and the base part of the brace, the pipe member acts like a "prop or drawbar" thereby allowing the suppression of various deformation of the brace even when the C-shape or the U-shape exhibits deformation such as "opening and narrowing" leading to deformation of "twisting in a horizontal plane" or "leaning" of the brace in the above described vibration mode 2 due to the fore-and-aft motion of the entire steering support member in the above-described vibration modes 1 and 2. This makes it possible to reduce the fore-and-aft motion of the steering support member thereby allowing the vibration of the steering support member to be further reduced.

Furthermore, in the structure of the present invention, since the pipe member is a sheet metal which is flat in the horizontal direction, the pipe member can be reduced in weight while exhibiting the above-described function. That is, since the effect of the pipe member in the present invention can be achieved sufficiently provided it has rigidity in the horizontal plane in the brace, similar effects can be obtained even if the pipe member is replaced with a flat plate. Furthermore, since the pipe member allows the adjustment of the vibration pattern of the steering support member by selecting the magnitude of the rigidity thereof as an add-on part, it is possible to modify the steering support member into a vibration pattern which is needed for each vehicle type.

Furthermore, in the structure of the present invention, since the pipe member is formed of a resin material, the pipe member can be further reduced in weight while exhibiting the above-described functions. That is, since the effect of the pipe member in the present invention can be sufficiently achieved provided it has a level of rigidity to enable the maintenance of the distance between opposing both edge parts of the C-shaped or U-shaped brace, similar effects can be obtained even if the material of the pipe member is replaced by a resin material. Furthermore, since the pipe member allows the adjustment of the vibration pattern of the steering support member by selecting the magnitude of the rigidity thereof as an add-on part as with the above described invention, it is possible to modify the steering support member into a vibration pattern which is needed for each vehicle type.

DETAILED DESCRIPTION OF PREFERRED EMBODIMENTS

Hereafter, the present invention will be described in detail based on the illustrated embodiments.

Figure 1:
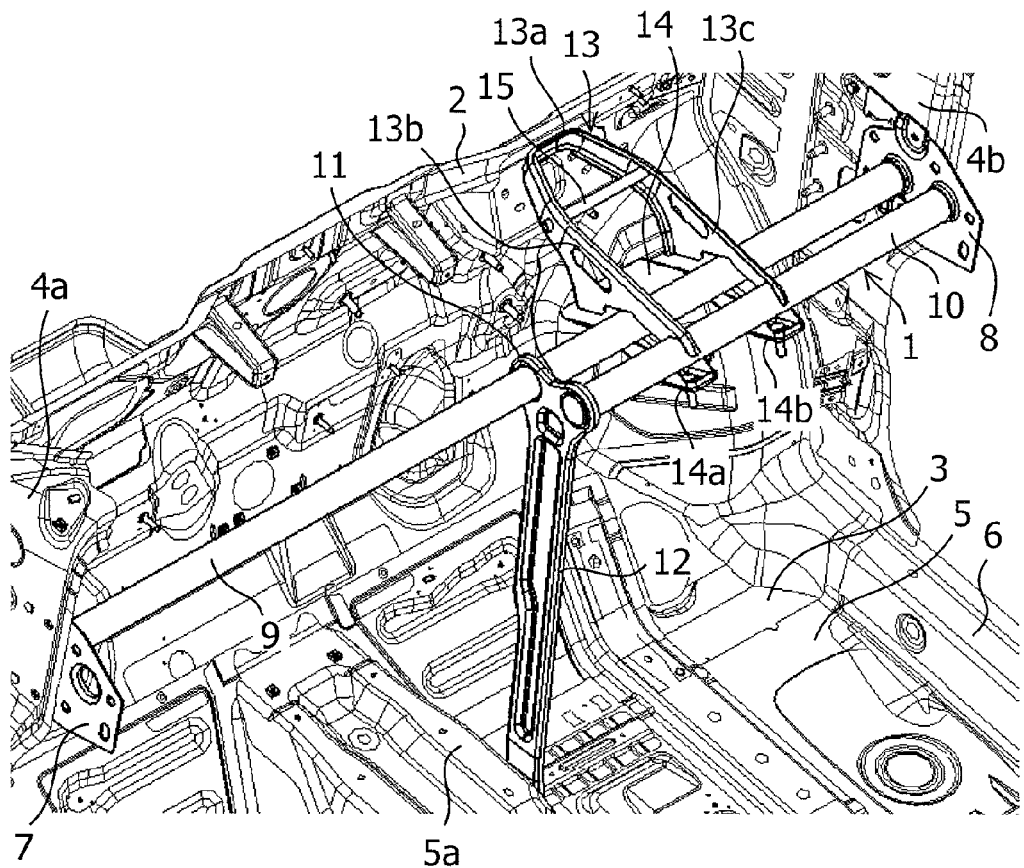
FIG. 1 is a perspective view to show a state in which a steering support member having a structure relating to an embodiment of the present invention is attached to the vehicle body in the vehicle interior of a motor vehicle.
Figure 2:
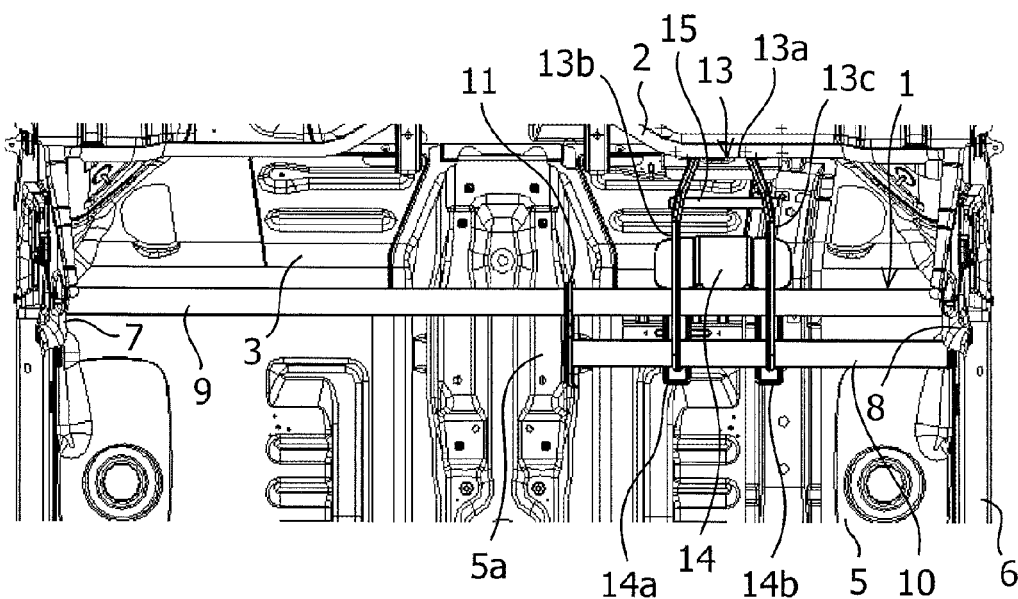
FIG. 2 is a plan view to show the steering support member of FIG. 1.
Figure 3:
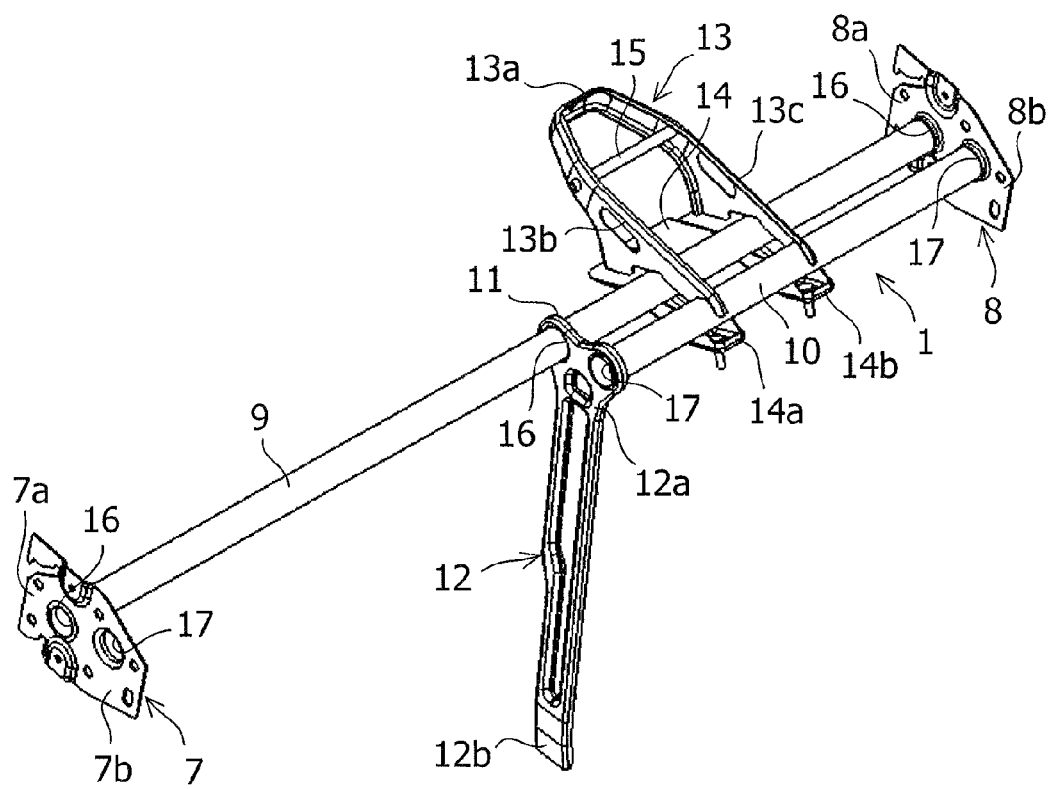
FIG. 3 is a perspective view to show the structure of the steering support member relating to the embodiment of the present invention.
Figure 4:
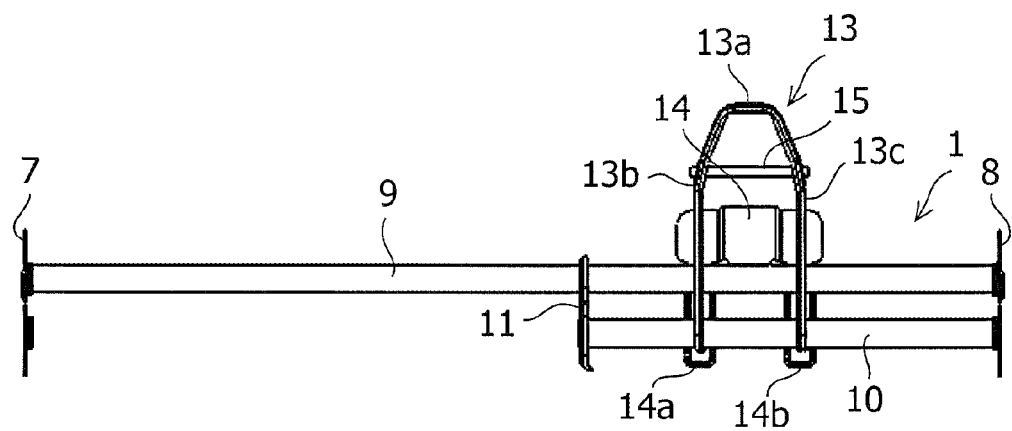
FIG. 4 is a plan view to show the structure of the steering support member of FIG. 3.

FIG. 1 is a perspective view of the vehicle interior of a motor vehicle to which the structure of a steering support member relating to an embodiment of the present invention is applied; FIG. 2 is a plan view of the vehicle interior of the motor vehicle of FIG. 1; FIG. 3 is a perspective view of the structure of the steering support member of the present embodiment; and FIG. 4 is a plan view of the structure of the steering support member of FIG. 3.

A steering support member 1 which is a rigid member extending in the vehicle-body width direction is arranged in the upper part of the front side of the vehicle interior of a motor vehicle as shown in FIGS. 1 and 2. This steering support member 1 is disposed inside an instrument panel (not shown), which is a large scale resin molded component, and in which various pieces of equipment are installed and support the instrument panel and the steering column (not shown) etc.

The vehicle body of the upper and lower parts of the front side in the vehicle interior of motor vehicle is made up of a cowl panel 2 and a dash panel 3; the vehicle body of both left and right sides in the vehicle-body width direction is made up of dash side panels 4a and 4b; a floor panel 5 and a side sill 6 are arranged on the vehicle-body rear side of the lower part of the dash panel 3. A convex floor tunnel 5a which extends in the vehicle body front-rear direction is provided in the middle part in the vehicle-body width direction of the floor panel 5.

The steering support member 1 is constructed across the width of vehicle body as shown in FIGS. 1 to 4, and is attached to dash side panels 4a and 4b, which are left and right vehicle body side walls, via end-part-connection brackets 7 and 8 of both left and right sides at both ends in vehicle-body width direction.

Furthermore, the steering support member 1 of the present embodiment is made up of a short and long, first and second support members 9 and 10 which are made up of two pipe members disposed side by side in parallel at a fixed spacing in the vehicle body front-rear direction, where the first support member 9 is disposed across the width of vehicle body and the second support member 10 is disposed in a region of corresponding portion at a front position on the driver seat side. Of the first and second support members 9 and 10, the first support member 9 is disposed on the vehicle-body front side and the second support member 10 is disposed on vehicle-body rear side. The diameter of the second support member 10 is specified to be greater than that of the first support member 9.

The end part on vehicle body side of the second support member 10 is attached, along with the first support member 9, to the dash side panel 4b via the end-part-connection bracket 8. Moreover, the end part opposite the vehicle body of the second support member 10 is attached to the first support member 9 via an intermediate-part-connection bracket 11.

The intermediate-part-connection bracket 11 is connected to a floor panel 5 via a first brace 12 extending in the vehicle body upward and downward direction. For this reason, an upper end part 12a of the first brace 12 is integrally formed into the intermediate-part-connection bracket 11, and a lower end part 12b of the first brace 12 is connected to the side surface of a floor tunnel 5a. It is noted that in the present embodiment, although the intermediate-part-connection bracket 11 and the first brace 12 are integrally formed, both members may be separate bodies.

Moreover, there are disposed at the middle in vehicle-body width direction of the second support member 10, as shown in FIGS. 1 to 4, a C-shaped (or U-shaped) second brace 13, which extends in the vehicle body front-rear direction and straddles the first and second support members 9 and 10 in the vehicle body front-rear direction, and a steering bracket 14 which is formed into a C-shape in a plan view, and which extends in the vehicle body front-rear direction and has an opening on the vehicle-body rear side.

The second brace 13 includes a base part 13a of which the vehicle-body front side is closed, and a pair of left and right edge parts 13b and 13c which are oppositely disposed by being extended in parallel from the base part 13a toward the rear of the vehicle while being spaced apart in the vehicle-body width direction, and is formed into a C-shape in plan view which has an opening on the vehicle-body rear side. The base part 13a of the second brace 13 is connected to the cowl panel in the front of the vehicle body. On the other hand, the steering bracket 14 includes support strips (members) 14a and 14b, which extend in the vehicle body front-rear direction while being spaced apart in the vehicle-body width direction, and the support strips 14a and 14b are disposed in parallel to straddle over the first and second support members 9 and 10.

Moreover, at the middle in the vehicle-body width direction of the second support member 10, one edge part 13c located on the right hand side (vehicle body side) of the second brace 13 is connected to both the first and second support members 9 and 10, and one support strip 14b located on the right hand side (vehicle-body side) of the steering bracket 14 is connected to both the first and second support members 9 and 10, so that the edge part 13c of the second brace 13 and the support strip 14b of the steering bracket 14 are disposed so as to be overlapped in the vehicle-body width direction.

Furthermore, at a position of ¼ of the total length of the second support member 10 from the middle in the vehicle-body width direction of the second support member 10 towards the intermediate-part-connection bracket 11, the other edge part 13b located on the left hand side (opposite side of vehicle body) of the second brace 13 is connected to both the first and second support members 9 and 10, and the other support strip 14a located on the left hand side (opposite side of vehicle-body) of the steering bracket 14 is connected to both the first and second support members 9 and 10, so that the edge part 13b of the second brace 13 and the support strip 14a of the steering bracket 14 are disposed so as to be overlapped in the vehicle-body width direction.

It is noted that in the present embodiment, although the edge parts 13b and 13c of the second brace are connected to both the first and second support members 9 and 10, they may be connected to the first support member 9 alone.

Such positional relationship between the edge parts 13b and 13c of the second brace 13 and the support strips 14a and 14b of the steering bracket 14 can be represented, as shown in FIG. 4, by a length with reference to the intermediate-part-connection bracket 11.

That is, letting the total length of the second support member 10 be L1, the length up to the middle in vehicle-body width direction of the second support member 10 be L2, and the half-length to the middle in vehicle-body width direction of the second support member 10 be L3, the relationship: L1=2×L2=4×L3 holds.

On the other hand, there are constructed between the opposing edge parts 13b and 13c of the second brace 13 relating to the present embodiment a pipe member 15 that connects to the edge parts 13b and 13c in such a way as to pass therethrough. The pipe member 15 is provided as a rod-like body which serves to suppress deformation of the second brace 13, in which the C-shape is widened to open or narrowed to contract due to the fore-and-aft motion of the entire steering support member 1 in a particular vibration mode, thereby suppressing a twisting deformation and a leaning deformation in the horizontal plane of the second brace 13; the pipe member 15 being disposed in parallel with the first support member 9 at an intermediate position in the front-rear direction closer to the front of vehicle-body, between first support member 9 and the base part 13a of the second brace 13.

Such pipe member 15 may be a sheet metal which is flat in the horizontal direction and allows weight reduction, or may be formed of resin material, provided that it has rigidity in the horizontal plane in the second brace 13.

It is noted that the end-part-connection brackets 7 and of both left and right sides of the present embodiment are formed of a substantially flat plate-like body respectively as shown in FIG. 3, and in one end-part-connection bracket 8 of the right side, the first support member 9 is connected to a portion 8a of the vehicle-body front side, and the second support member 10 is connected to a portion 8b of the vehicle-body rear side. Moreover, at the left-side end-part-connection bracket 7 of the other hand, the first support member 9 is connected to a portion 7a of the vehicle-body front side. For this reason, as shown in FIG. 3, the front and rear portions 7a, 7b, 8a, and 8b of the end-part-connection brackets 7 and 8 are drilled with insertion holes 16 and 17 through which the end parts of the first and second support members 9 and 10 are inserted, and the first and second support members 9 and 10 are fixed by welding in a state of being inserted into the insertion holes 16 and 17. It is noted that insertion holes 16 and 17 into which the first and second support members 9 and 10 are inserted are drilled in the front and rear of the intermediate-part-connection bracket 11 as with the end-part-connection brackets 7 and 8.

Thus, the steering support member 1 having a structure relating to an embodiment of the present invention includes a first support member 9 which is disposed across the width of the vehicle body on the vehicle-body front side, and a second support member 10 which is disposed in a region of a corresponding location of the driver seat side and on the vehicle-body rear side, in which in the first and second support members 9 and 10, the end part on the vehicle body side is attached, along with the first support member 9, to the dash side panel 4b via the end-part-connection bracket 8, and the end part opposite the vehicle body of the second support member 10 is attached to the first support member 9 via the intermediate-part-connection bracket 11. Moreover, in the middle in the vehicle-body width direction of the second support member 10, one edge part 13c of the second brace 13 which is formed into a C-shape and connects to both the first and second support members 9 and 10, and the support strip 14b of the steering bracket 14 which is formed into a C-shape and connects to the first and second support members 9 and 10, are disposed so as to be overlapped in the vehicle-body width direction. At a position at a length L3 of ¼ of the total length L1 of the second support member 10 from the middle in the vehicle-body width direction of the second support member 10 towards the intermediate-part-connection bracket 11, the other edge part 13b of the second brace 13 which connects to both the first and second support members 9 and 10, and the other support strip 14a of the steering bracket 14 which connects to the first and second support members 9 and 10 are disposed so as to be overlapped, and the base part 13a of the second brace 13 is connected to a cowl panel 2.

For this reason, it is possible to securely attach not only both ends of the first support member 9 making up the steering support member 1, but also both ends of the second support member 10 to the dash side panel 4b and the first support member 9, and to improve the rigidity of the entire steering support member 1. Moreover, since the opposing two edge parts 13b and 13c of the C-shaped second brace 13 serves to suppress the vibration, particularly the edge part 13b on the middle side of the second brace 13 is close to the antinode of vibration and is effective in suppressing the motion, and also effective in reducing the rotational component in the horizontal plane around the node at the middle, the vibrations of the nodes at both ends and the middle come to have opposite phases in amplitude near the second brace 13 for the fore-and-aft motion of the whole structure so that two amplitudes are neutralized in the vicinity of the outer edge part, thereby reducing vibration and further increasing the rigidity of the entire steering support member 1. Furthermore, when the vibration modes of the first and second support members 9 and 10 are different, it is possible to suppress the antinode of vibration by finely adjusting the position of the second brace 13 or the steering bracket 14, or selecting the rigidity of the second brace 13, thus allowing the setting of an optimal vibration mode in accordance with vehicle models.

Moreover, since there is disposed between the opposing edge parts 13b and 13c formed into a C-shape of the second brace relating to an embodiment of the present invention, a pipe member 15 which connects the edge parts 13b and 13c, in parallel with the first support member 9 at an intermediate position in the front-rear direction between the first support member 9 and the base part 13a of the second brace 13, it is possible to suppress the deformation of the second brace 13 by the action of the pipe member 15 even when the C-shape of the second brace 13 is caused to produce various deformation described above by the fore-and-aft motion of the entire steering support member 1 in a specific vibration mode, thereby effectively reducing the fore-and-aft motion of the steering support member 1, and more efficiently reducing the vibration of the steering support member 1.

Although embodiments of the present invention have been described so far, the present invention may be subjected to, without being limited to the embodiments described above, various variations and modifications based on the technical concepts of the present invention.

For example, although in the embodiment described above, the lower end part 12b of the first brace 12 is connected to the floor panel 5, it may be connected to a lower part of the dash panel 3 depending on the type of the vehicle to which the invention is applied. Moreover, although in the embodiments described above, the base part 13a of the second brace 13 is connected to the cowl panel 2, it may be connected to the upper part of the dash panel 3 depending on the type of the vehicle to which the invention is applied. Furthermore, although the steering bracket 14 is formed into a C-shape in the embodiment described above, it may be made up of two parallel members extending in the vehicle body front-rear direction depending on the type of vehicle to which the invention is applied.

What is claimed is:

1. A steering support member structure which is constructed across a width of a vehicle body and is attached to left and right sides of the vehicle body at both ends in a vehicle-body width direction via an end-part-connection bracket,
wherein the steering support member comprises two support members disposed side by side in parallel, a first support member being disposed across the entire width of the vehicle body and a second support member being disposed in a corresponding location on a driver seat side,
wherein an end part on the vehicle body side of the second support member is attached, along with the first support member, to the vehicle body via the end-part-connection bracket, and an end part opposite the vehicle body of the second support member is attached to the first support member via an intermediate-part-connection bracket,
wherein a C-shaped or U-shaped brace which extends in a vehicle body front-rear direction and straddles the first and second support members in the vehicle body front-rear direction, and a steering bracket which is C-shaped or made up of two parallel members and which extends in the vehicle body front-rear direction, are disposed in the middle in the vehicle-body width direction of the second support member,
wherein one edge part of the brace which connects to at least one of the first and second support members, and one member of the steering bracket which connects to the first and second support members are disposed so as to be overlapped at the middle in the vehicle-body width direction of the second support member, and another edge part of the brace which connects to either or both of the first and second support members, and the other member of the steering bracket which connects to the first and second support members are disposed so as to be overlapped at a position at ¼ of the total length of the second support member from the middle in the vehicle-body width direction of the second support member towards the intermediate-part-connection bracket,
wherein a C-shaped or U-shaped base part of the brace, of which the vehicle-body front side is closed, and which is disposed on the vehicle-body front side spaced apart from the first and second support members, is connected to an upper part of a cowl panel or dash panel in the front of the vehicle body, and
wherein there is constructed between the opposing edge parts of the C-shaped or U-shaped brace a pipe member which is disposed in parallel with the first support member, and connects to the opposing edge parts at an intermediate position in the front-rear direction between the first support member and the base part of the brace.

2. The structure of a steering support member according to claim 1, wherein the pipe member is formed of a resin material.

3. The structure of claim 1, wherein the C-shaped or U-shaped base part of the brace suppresses vibration against a fore-and-aft vibration of the steering support member.

4. The structure of claim 1, wherein a length in the vehicle-body width direction of the base part of the brace is made smaller than the space between the opposing edge parts in which the pipe member is constructed therebetween, and the front of the U-shaped brace is made smaller in the front of the vehicle body with respect to the pipe member.

5. The structure of claim 1, wherein the opposing edge parts of the brace extend in the vehicle body front-rear direction in at location at which the two support members are disposed side by side in parallel.

6. The structure of claim 1, wherein the edge parts of the brace are not directly connected with each other at any location rear of the pipe member in the front-rear direction.

* * * * *